United States Patent Office 3,728,162
Patented Apr. 17, 1973

3,728,162
METHOD OF PRODUCING CHILL CAST PARTICULATE COMPOSITES
Leonard B. Griffiths, North Reading, Mass., assignor to P. R. Mallory & Co. Inc., Indianapolis, Ind.
Original application Sept. 15, 1967, Ser. No. 667,910, now Patent No. 3,558,305, dated Jan. 26, 1971, which is a continuation-in-part of abandoned application Ser. No. 597,401, Nov. 11, 1966. Divided and this application Oct. 2, 1969, Ser. No. 871,164
Int. Cl. C22f 1/16
U.S. Cl. 148—3
2 Claims

ABSTRACT OF THE DISCLOSURE

A ductile and high strength chill cast beryllium composite composed essentially of beryllium particles substantially surrounded by an alloy matrix of aluminum-magnesium-silicon. The composite consists essentially of about 85–60% by weight beryllium, about 39.5–13% by weight aluminum, about 3.6–0.10% by weight magnesium, and about 1.5–0.08% by weight silicon. Within the ranges of proportions of elements contributing to the ductility and strength of the composite, two different alloy matrix species arise. One of the alloy matrix species contains an excess of silicon to magnesium to a degree whereby the matrix alloy may be categorized as silicon rich with respect to the magnesium content. In the silicon rich alloy matrix substantially all of the magnesium will combine with the silicon. The remaining alloy matrix species contains an excess of magnesium to silicon to a degree whereby the matrix alloy may be categorized as magnesium rich with respect to the silicon content. The mechanical properties of the composites embodying the silicon rich alloy matrix and the magnesium rich alloy matrix, such as ductility and strength, are outstanding; however, the ductility and strength characteristics of the composites embodying the silicon rich alloy matrix are more outstanding than the ductility and strength characteristics of the composites embodying the magnesium rich alloy matrix.

---

This is a division of application Ser. No. 667,910, filed Sept. 15, 1967, now Pat. No. 3,558,305 which in turn was a continuation-in-part of application Ser. No. 597,401, filed Nov. 11, 1966, now abandoned.

The present invention relates to ductile composites of beryllium, more particularly, to as-cast means and methods of providing a ductile beryllium-aluminum-magnesium-silicon composite wherein the beryllium crystals are single crystals dispersed in a matrix of aluminum-magnesium-silicon-beryllium.

Beryllium possesses physical properties which make the metal attractive for use in a variety of commercial applications such as, for example, airplane parts, gears, fasteners and the like. However, beryllium metal includes a physical property which has limited its commercial acceptance. Beryllium is inherently brittle at room temperature.

The brittleness of beryllium is attributed to the crystal structure which is a hexagonal system with an extremely small axial to basal ratio. The axial ratio of the beryllium crystal is the smallest of any hexagonal structured metal. The cleavage strength of beryllium is also low, a feature which may be attributed to the crystal structure and size through the elastic moduli. The single crystal of beryllium is severely anisotropic with respect to its mechanical properties. As a result, the mechanical properties of polycrystalline beryllium are highly dependent upon grain orientation and upon grain size. Thus during deformation of an article fabricated from beryllium metal, the basal planes of the hexagonal close-packed structure, being the easiest to slip, are aligned along the working direction. Since slip is crystallographically difficult perpendicular to the basal plane, the ductility of the beryllium article perpendicular to the primary fabrication direction is virtually nonexistent.

Since fracture is known to occur on definite crystallographic planes, it is thought that fracture in beryllium articles involves a mechanism of gross crack propagation when cracks approach grain size. Thus it appears that fracture strength would be increased if the grain size was reduced.

A variety of different metals and alloys have been added to beryllium in an effort to improve the mechanical properties of beryllium, with particular emphasis on improving the mechanical property of ductility. Prior art teachings have been directed toward deoxidation, grain refinement, and alteration of the crystal structure of beryllium. The above attempts did not significantly improve the ductility of beryllium. Deoxidants such as zirconium, titanium, aluminum, and the like have been added to melts of beryllium. However, these deoxidants did not significantly improve the ductility of beryllium since the oxide film on beryllium is rather stable.

Attempts have been made to cast beryllium in a suitable mold; however, the resultant structure is characterized by a coarse grain structure that is brittle and has strength defects. Cross-rolling and cross-forging of beryllium reduces the number of basal planes along the direction of rolling and resulted in improved ductility. However, the degree of improvement is unsatisfactory and beryllium must still be classified as brittle.

Attempts have been made also to cast alloys of ductile metals with beryllium by ordinary casting means and by chill-casting. However such attempts have not resulted in products which have desirable strength characteristics and are possessed of satisfactory ductility.

A means and method have been discovered for preparing a fine grain beryllium composite having highly desirable physical properties using chill casting techniques wherein the individual beryllium grains are surrounded by a ductible matrix alloy, no grain growth is experienced during the very rapid cooling thereof and wherein the individual beryllium grains have a diameter of between 5 and 20 microns. Subjecting a beryllium article that has experienced grain growth to hydrostatic stress results in shear stresses in excess of the basal plane fracture stress generated along beryllium-beryllium grain boundaries. It is thought that a ductile beryllium article can best be realized by a beryllium particulate composite wherein individual grains of beryllium are single crystals having a determined diameter and wherein each individual grain of beryllium is surrounded by a ductible matrix alloy.

It was found that chill casting techniques applied to a melt of beryllium and an aluminum base alloy containing minor amounts of magnesium and silicon provided a ductile beryllium composite wherein the beryllium content was about 60 to 85 percent by weight of the composite. The beryllium and the matrix alloy were completely molten when chill casted so as to obtain the high nucleation rate necessary to yield an article composed of single crystals of beryllium having a grain diameter of 5 to 20 microns embedded in a ductile matrix alloy of aluminum-magnesium-silicon-beryllium.

It was found that within the range of proportions of the constituents of the alloy matrix of aluminum-magnesium-silicon contributing to the ductility and strength of the composite, two different alloy matrix species arose. One of the alloy matrix species may contain an excess of silicon to magnesium to a degree whereby the matrix alloy may be categorized as silicon rich with respect to the magnesium content. In the silicon rich alloy matrix it was found that substantially all of the magnesium combines with the silicon. The remaining alloy matrix species contains an excess of magnesium to silicon to a degree whereby the matrix alloy may be categorized as magnesium rich with respect to the silicon content. The mechanical properties of the composites embodying the silicon rich alloy matrix and the magnesium rich alloy matrix, such as ductility and strength, are outstanding; however, the ductility and strength characteristics of the composites embodying the silicon rich alloy matrix are more outstanding than ductility and strength characteristics of the composites embodying the magnesium rich alloy matrix.

A tough, tenacious film of beryllium oxide is present on the beryllium and must, for best results, be removed during the melting of the beryllium or the oxide film will prevent or inhibit the melt of the aluminum alloy from wetting the beryllium grains. If the oxide film is not removed from the beryllium, the beryllium and the aluminum matrix does not satisfactorily alloy. An agent must be used to either break down the oxide film on the beryllium or segregate to the metal oxide interface and lower the surface energy of the liquid alloy with respect to the beryllium oxide film so that the liquid metal progressively dissolves the beryllium as the temperature of the melt progresses toward 1300° C. It is seen that the ultimate temperature of the melt is above the 1277° C. melting point temperature of beryllium. Alkali and alkaline earth halogenide agents such as lithium fluoride-lithium chloride or lithium fluoride may be used to segregate to the solid interface of the beryllium and hence allow the matrix alloy to wet the individual beryllium grains. The agency may, in this instance, be called a fluxing agent, flux, or getter. However, such an agent does have other characteristics which assist in wetting the beryllium grains so as to surround the individual beryllium grains with a ductile envelope phase of aluminum-magnesium-silicon-beryllium alloy matrix metal.

Therefore, it is an object of the present invention to provide improved grain refinement in beryllium composites by chill casting the beryllium composites.

Another object of the present invention is to provide a beryllium composite wherein thickness reductions up to about 88 percent of the original thickness may be achieved during cold rolling of the beryllium composite without grain boundary tearing or of cleavage cracking in beryllium grains.

Another object of the present invention is to provide a desirably ductile composite of beryllium-aluminum-magnesium-silicon wherein the matrix alloy consists of either an excess of silicon to magnesium to a degree whereby the matrix alloy may be categorized as silicon rich or an excess of magnesium to silicon to a degree whereby the matrix alloy may be categorized as magnesium rich.

A further object of the present invention is to provide a ductile composite of beryllium-aluminum-magnesium-silicon wherein up to about 0.5 percent, by weight, of the weight matrix alloy is beryllium.

Yet another object of the present invention is to provide a ductile composite of beryllium-aluminum-magnesium-silicon in which the beryllium is the predominate metal.

A further object of the present invention is to provide a fine beryllium grain structure wherein only single crystal beryllium grains having a diameter of 5 to 20 microns exist in a chill cast beryllium composite.

A further object of the present invention is to provide a chill cast fine grain beryllium composite comprising about 60 to 85 percent by weight beryllium, the remainder an alloy of aluminum-magnesium-silicon.

Still another object of the present invention is to provide a method of chill casting fine grain beryllium composites wherein a lithium fluoride-lithium chloride agent or a lithium fluoride agent is used to promote wetting between the beryllium grains and the alloy matrix.

Yet another object of the present invention is to provide a method for chill casting fine grain beryllium composites wherein beryllium grain growth does not take place during the casting of the beryllium composite.

A further object of the present invention is to provide a method for chill casting fine grain beryllium composites having low density and high strength.

Yet another object of the present invention is to provide means and method whereby a ductile beryllium-aluminum-magnesium-silicon composite is successfully fabricated in both a practical and economical manner.

The present invention, in another of its aspects, relates to the novel features of the instrumentalities of the invention described herein for teaching the principal objects of the invention and to the novel principles employed in the instrumentalities whether or not these features and principles may be used in the said object and/or in the said field.

With the aforementioned objects enumerated, other objects will be apparent to those persons possessing ordinary skill in the art. Other objects will appear in the following description and appended claims. The invention resides in the novel combination of elements and in the means and method of achieving the combination as hereinafter described and more particularly as defined in the appended claims.

In the drawings:

FIG. 1 is a graphic showing the stress-strain relationship of the aluminum-magnesium-silicon matrix and the aluminum-magnesium-silicon-beryllium matrix.

FIG. 2 is a showing of a composite of about 70 percent by weight beryllium, about 29.5 percent by weight aluminum, about 0.25 percent by weight magnesium, the remainder silicon illustrating the fine beryllium grains surrounded by a ductile envelope phase of an aluminum-magnesium-silicon-beryllium alloy.

Figure 1:
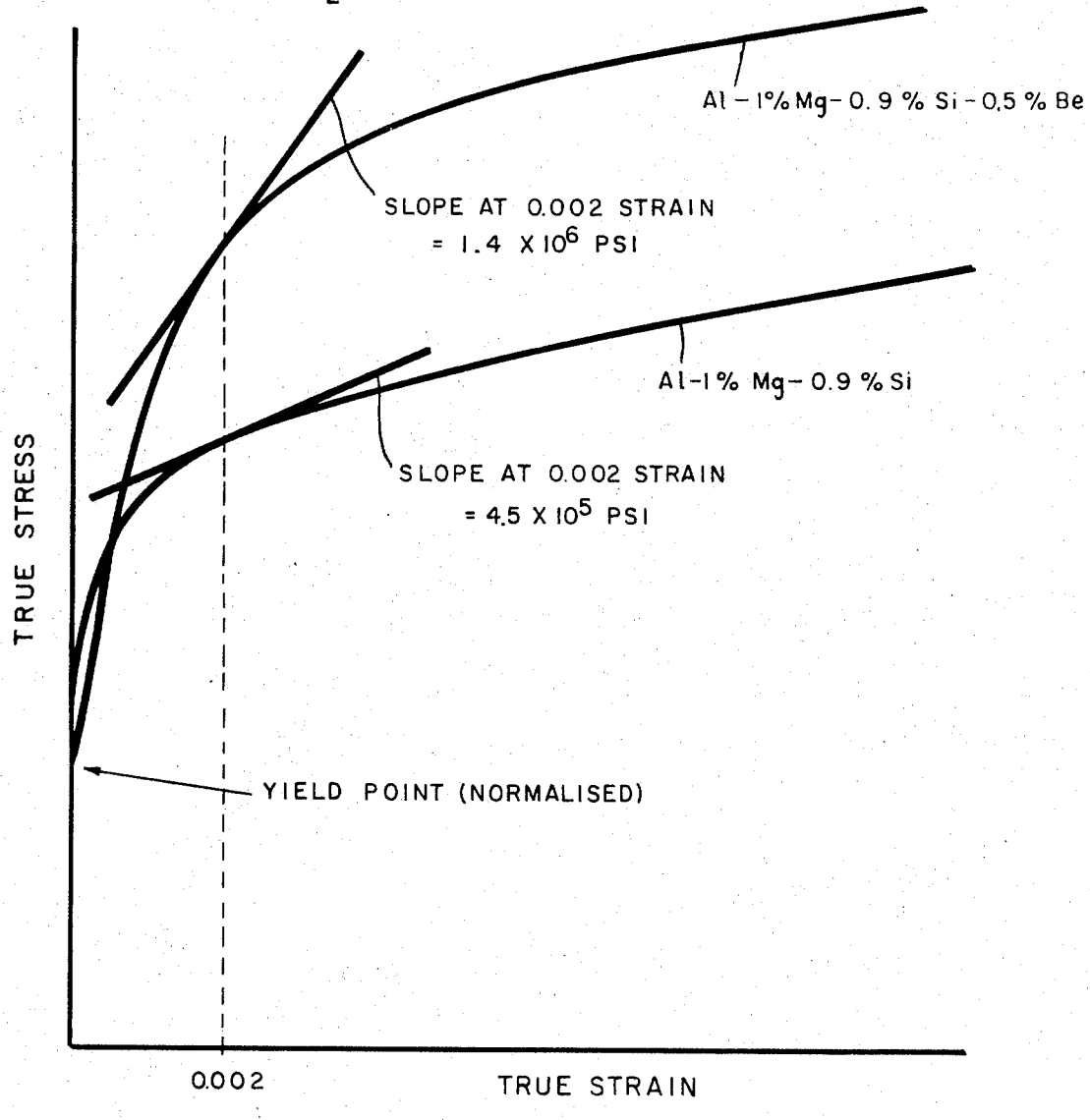

Generally speaking the means and method of the present invention relate to a ductile beryllium-aluminum-magnesium-silicon composite fabricated by chill casting. The composite consists of 60 to 85 percent by weight beryllium, 13.0 to 39.5 percent by weight aluminum, about 0.1 to 3.6 percent by weight magnesium and about 0.08 to 1.5 percent by weight silicon. The amount of beryllium alloyed in the matrix is believed to be about 0.2 to 0.5 percent by weight of the total composite constituents. The individual grains of beryllium are thought to have a diameter of about 5 to 20 microns separated from one another by an alloy matrix of aluminum-magnesium-silicon-beryllium having a thickness between the beryllium grains thought to be about 0.1 to 2 microns on the average. The grain size of the beryllium and the thickness of the alloy matrix between the grains are important and thus optimization will achieve the best results in ductility and other mechanical properties. It will be understood that the beryllium employed according to this invention is of commercial purity. In such beryllium one encounters very small amounts of various impurities such as carbon, iron, aluminum, silicon and magnesium. The particular beryllium generally employed in the examples contained 0.01% magnesium and 0.02% silicon each by weight. Such small amounts of impurities may be ignored for they appear to have no contribution to the advantageous properties of the composites of this invention. In determining the composite characteristics when combining commercial beryllium having the aforementioned impurities with the alloy matrix, the impurities are thought to be differentially segregable and apparently combine with the matrix metal alloy to define the final mechanical properties of the composite. Accordingly, the final composite as far as the mechanical properties such as strength, ductility and the like are concerned are thought to be obtainable only by particular combination of the materials and in the method used to combine the same. It will be understood that the percentage ranges of aluminum, magnesium and silicon which have been set forth above are those percentages which are added to ordinary beryllium of commercial purity.

The chill cast beryllium composite may be produced by mixing chunks of vacuum cast crushed lump beryllium available from Brush Beryllium Corporation together with chunks of the aluminum-magnesium-silicon alloy of the desired composition together with a small portion of an agent selected from the group consisting of alkali and alkaline earth halogenides. The mix may be heated in a crucible to a temperature above the melting point temperature of beryllium to form a melt of beryllium-aluminum-magnesium-silicon. The agent substantially removes the oxide film from the beryllium so that the alloy may wet, dissolve and thereby form a homogeneous melt with the beryllium without excessive superheat being applied to the matrix which would otherwise be lost by evaporation. The melt may be chill cast in a mold so as to form a composite of beryllium grains dispersed in a matrix of aluminum-magnesium-silicon-beryllium. The composite may then be treated so as to develop its optimum properties.

In carrying out the present invention, a beryllium base composite may be fabricated by melting together a suitably crushed lump of beryllium and a pre-made alloy of aluminum-magnesium-silicon. The constituents may be placed in a suitable crucible such as a beryllium oxide crucible or the like. An agent comprising a small quantity of lithium chloride-lithium fluoride may be added to the crushed constituents in the crucible. The constituents may be melted together by induction heating at about 1350±50° C. for about 30 minutes in an inert atmosphere such as argon or the like at about 1 atmosphere of pressure. The lithium fluoride-lithium chloride agent is thought to act as flux or getter and remove the oxide film present on the beryllium. Substantially all of the lithium fluoride-lithium chloride is thought to decompose as it removes the oxide film from the beryllium. It is thought that the flux will be lost during preparation of the melt presumably by vaporization, while the oxide will form a crustation on the top surface of the melt.

The melt may be cast directly into a split mold fabricated from any suitable material having good thermal conductivity characteristics such as a split steel mold or a split copper mold which may be equipped with water cooling. It is thought that it is important to obtain an extremely rapid rate of cooling of the melt through the solidification range thereof in order to prevent excessive grain growth of the beryllium which would lead to beryllium-beryllium contiguity.

The cast composite may be heat treated by annealing at about 400° C. for about 12 hours. The composite then may be quenched into a suitable quenching medium such as water or the like at substantially room temperature. Thereafter, the composite may be aged at about 200°–220° C. for about 30 minutes. The heat treatment of the composite is thought to be desirable in order to realize optimum strength from the aluminum-based matrix alloy.

The resultant composite is thought to retain the strength and low density characteristics of the beryllium and the ductile matrix is thought to serve to constrain the beryllium so that the beryllium and the ductile matrix phase deformed continuously under load.

It is thought that if the beryllium content of the composite exceeded about 85 percent by weight, grain contiguity developed, resulting in undesirable brittleness, and if the beryllium content of the composite dropped below about 60 percent by weight, it is thought that the density value of the composite would be raised to a value of little interest. Employment of 68–78% beryllium is preferred.

Within the ranges of proportions of elements contributing to the ductility and strength of the composites two different species arise. This is thought to be due to the fact that magnesium combines with silicon to form $Mg_2Si$ more easily than it combines with aluminum to form $Al_3Mg_2$. Thus, whenever the atomic ratio of magnesium to silicon present in the composite is 2:1 or less, no significant amount of $Al_3Mg_2$ is present thereby providing a matrix alloy that may be classified as silicon rich. The combination of mechanical properties, particularly of strength and ductility has been found for some services to be more advantageous than in composites wherein there is present in an atomic ratio to silicon in excess of 2:1. In the composite wherein the atomic ratio of magnesium to silicon is in excess of 2 to 1, the matrix alloy may be categorized as magnesium rich. Thus, while within the broader range of proportions set forth previously, highly useful composites are obtained, it is preferred for many purposes that the atomic ratio of magnesium to silicon not exceed 2:1. This atomic ratio of 2:1 is equivalent to a weight ratio of about 1.75:1. The presence of $Al_3Mg_2$ in the matrix appears to effect a decrease in strength and also probably ductility of the composite, which may be desirable for some services.

Thus, keeping in mind that small proportions of beryllium, on the order of a few tenths of one percent by weight based on the matrix, are present in the matrix itself, when magnesium is present in an amount exceeding a 2:1 atomic ratio to silicon the matrix system is either $Al_{(ss)}+Al_3Mg_2$ or $Al_{(ss)}+Al_3Mg_2+Mg_2Si$. (The notation $_{(ss)}$ means solid solution.) However, when the magnesium is present in an amount of about 2:1 or less atomic ratio to silicon the matrix system is either $Al_{(ss)}+Mg_2Si$ or $Al_{(ss)}+Mg_2Si+Si$ to the extent that silicon is present in excess of the stoichiometric amount required for $Mg_2Si$. The excess of silicon included is desirably less than 1.0 percent, by weight and preferably less than 0.5 percent by weight of the matrix constituents. Moreover, it is preferred that each of the additions of magnesium and of silicon not exceed more than 1.0 percent by weight of the constituents of the matrix.

The previously mentioned small amount of beryllium present in the matrix, about 0.5 percent, by weight of the matrix, has a very important influence upon the solid state precipitation hardening process in the matrix alloy. The influence of beryllium is well developed in alloys of $Al\pm Mg_2Si$ (with or without excess Si). In a "pure" Al-Mg-Si alloy (say Al-1% wt. Mg-0.5% wt. Si) the $Mg_2Si$ phase precipitates from quenched solid solution via an intermediate, partially coherent, stage. Establishment of this quasi-equilibrium configuration is dependent upon the excess vacant lattice sites which are present in the "as-quenched" structure. However, with beryllium also in solid solution this stage does not occur to the same extent (because the beryllium atoms associate with the vacant lattice sites) and the equilibrium $Mg_2Si$ structure forms directly. Under these circumstances the particle size of $Mg_2Si$ is very small and the alloy then deforms in a manner typical of a dispersion strengthened rather than a precipitation hardened alloy.

The rate of work hardening is very much higher especially in the early stages of plastic yielding. FIG. 1 serves to illustrate these effects. It is important in a particulate composite that the matrix work hardening rate be as high as possible since this leads to better load transfer and, therefore, (in general) better ductility.

Figure 2:
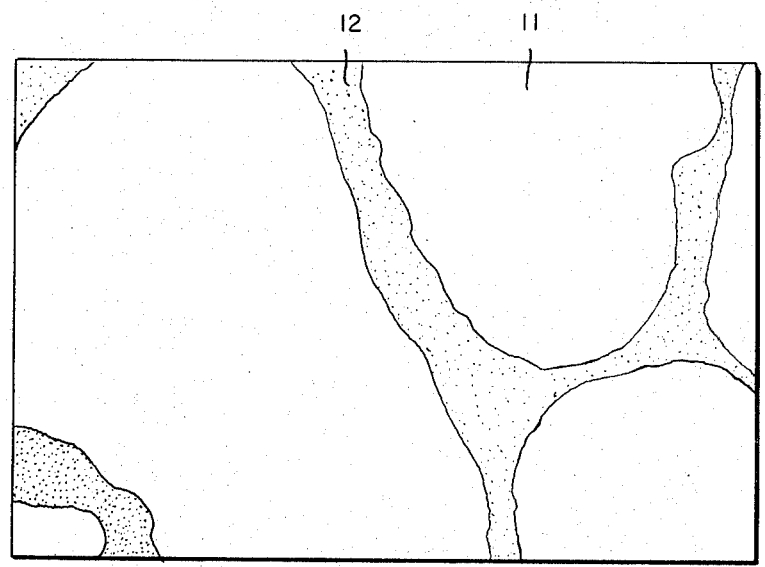

The resultant microconfiguration of the beryllium composite 10 is illustrated in FIG. 2. The beryllium grain size should be about 5 to 20 microns and the beryllium 11 should be uniformly dispersed throughout the composite. The aluminum-base matrix alloy 12 should have a thickness between the beryllium grains of about 0.1 to 2 microns.

Figure 3:
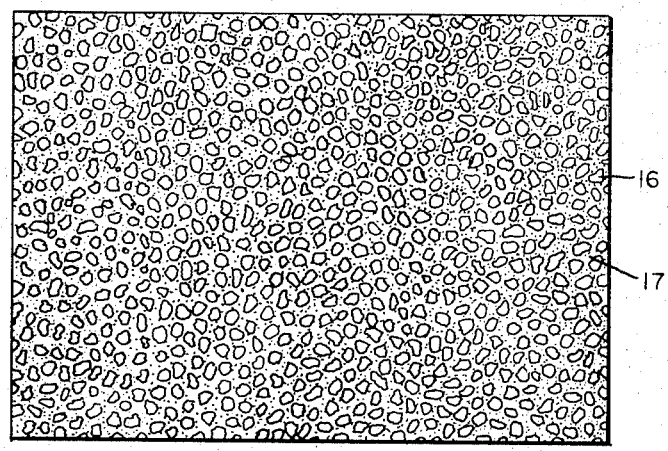
FIG. 3 is a showing of a 70 percent by weight beryllium composite illustrating the microstructure of the composite after heat treating but before cold rolling.
Figure 4:
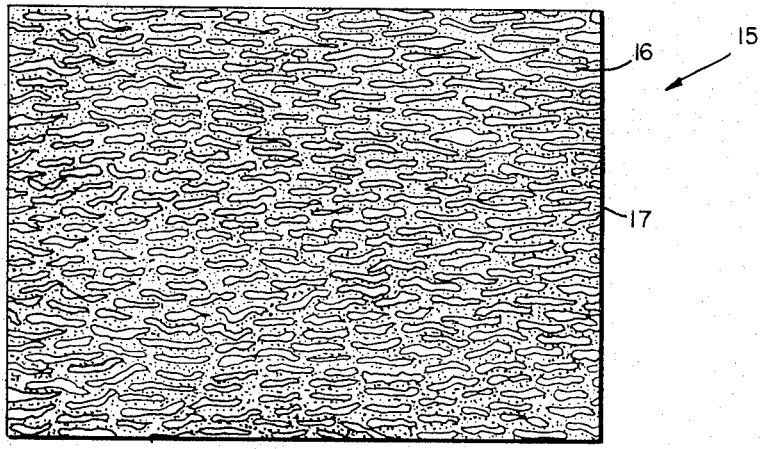
FIG. 4 is a showing of the beryllium composite illustrated in FIG. 2 after the composite is cold rolled to about 12 percent of its original thickness.

FIG. 3 shows a beryllium composite 15 having beryllium 16 uniformly dispersed throughout an aluminum-magnesium-silicon-beryllium matrix 17 prior to cold rolling. FIG. 4 shows the composite of FIG. 3 after subjection to cold rolling which, it is though, will reduce the thickness of the composite by about 88 percent. The cold rolling demonstrates the fabricability of the composite. It should be noted that the composite should experience no grain boundary tearing or cleavage cracking in the beryllium grains as a result of cold rolling.

The following example is illustrative of the preparation of a beryllium-aluminum-magnesium-silicon composite by chill casting.

EXAMPLE 1

A composite of about 70 percent by weight beryllium, about 29.5 percent by weight of aluminum, about 0.25 percent by weight magnesium and the remainder silicon.

Chunks of beryllium and an alloy of aluminum-magnesium-silicon having a purity of at least 99.99 percent may be placed together in a beryllium-oxide crucible. About 2 percent by weight of the total metal additions of about 3 parts lithium chloride to 1 part lithium fluoride may be added to the contents of the crucible. The elements in the crucible may be melted by induction heating in an argon atmosphere at about 1300° C. for about 30 minutes. The melt may be cast directly into a split copper mold that was water cooled. The chill cast beryllium composite may be removed from the mold and the composite may be heat treated by annealing at about 480–500° C. for about 2 to 12 hours, quenched in water at room temperature and aged at about 200–220° C. for about 30 minutes.

EXAMPLE 2

A composite of about 70 percent by weight beryllium, about 26.7 percent aluminum, about 3.0 percent by weight magnesium and the remainder silicon.

Chunks of beryllium and an alloy of aluminum-magnesium-silicon having a purity of at least 99.99 percent were placed together in a beryllium crucible. About 2 percent by weight of the total metal additions of about 3 parts lithium chloride to 1 part lithium fluoride was added to the contents in the crucible. The elements in the crucible were melted by induction heating in an argon atmosphere at about 1300° C. for about 30 minutes. The melt was cast directly into a split copper mold that was water cooled. The chill cast beryllium composite was removed from the mold and the composite was heat treated by annealing at about 400° C. for about 12 hours, quenched in water at room temperature and aged at about 220° C. for about 2 hours.

The percent by weight of the ingredients of the composite may be varied considerably while still retaining the advantages of the invention. The materials contemplated by the invention suitable for most purposes will generally fall within the following range of percent by weight:

| | Percent by weight |
|---|---|
| Beryllium | 60–85 |
| Aluminum | 13.0–39.5 |
| Magnesium | 0.10–3.6 |
| Silicon | 0.08–1.5 |

Composites of beryllium may also be prepared using 0.5 and 1 percent by weight of the total metal additions of the agent lithium fluoride-lithium chloride or of the agent lithium fluoride using the aforementioned procedure. In addition, composites may be prepared using 0.5, 1.0 and 2.0 percent by weight of lithium fluoride-lithium chloride having a ratio of 1 part to 1 part and 3 parts to 1 part.

It is thought that the foregoing method is applicable to other beryllium composite compositions with the matrix based on aluminum. However, it is thought that the choice of the matrix is controlled by the chemistry of the system and the ability to strengthen the matrix by solid state heat treatment. These factors, it is thought have little to do with the ability to chill cast a fine grain structure.

The present invention is not intended to be limited to the disclosure herein, and changes and modifications may be made in the disclosure by those skilled in the art without departing from the spirit and scope of the novel concepts of this invention. Such modifications and variations are considered to be within the purview and scope of this invention and the appended claims.

Having thus described my invention, I claim:

1. A method of producing a beryllium-aluminum-magnesium-silicon composite which consists of essentially of about 60 to 85 percent by weight beryllium, about 13.0 to 39.5 percent by weight aluminum, about 0.10 to 3.6 percent by weight magnesium and about 0.08 to 1.5 percent by weight silicon, said method comprising the steps of mixing chunks of beryllium and chunks of an alloy of aluminum-magnesium-silicon together with a portion of an agent selected from the group consisting of alkali and alkaline earth halogenides, heating said mix in a crucible to a temperature above the melting point temperature of beryllium to form a melt of beryllium-aluminum-magnesium-silicon, said agent substantially removing the oxide film from said beryllium so that said alloy wets said beryllium and homogenously alloys with it, chill casting said melt in a mold so as to form a composite of beryllium grains dispersed in a matrix of aluminum-magnesium-silicon-beryllium, and heat treating said composite at a temperature and for a time sufficient to improve the strength of said matrix.

2. A method of producing a beryllium-aluminum-magnesium-silicon composite as claimed in claim 1, wherein said beryllium includes impurities which differentially segregate and combine with said matrix.

References Cited

UNITED STATES PATENTS 1,952,048    3/1934    Archer et al. _____ 75—150

RICHARD O. DEAN, Primary Examiner

U.S. Cl. X.R.

148—13, 158